June 4, 1957  G. A. LYON  2,794,684

WHEEL COVER

Filed Feb. 25, 1954

Inventor
GEORGE ALBERT LYON

United States Patent Office 2,794,684
Patented June 4, 1957

2,794,684

WHEEL COVER

George Albert Lyon, Detroit, Mich.

Application February 25, 1954, Serial No. 412,550

9 Claims. (Cl. 301—37)

The present invention relates to improvements in wheel structures and more particularly concerns the ornamental and protective covering of the outer sides of vehicle wheels.

An important object of the present invention is to provide an improved wheel structure including a self-retaining ornamental cover at the outer side thereof.

Another object of the invention is to provide for a wheel structure including cover retaining bumps thereon a novel cover having a two part construction including a retaining bump engaging portion.

A further object of the invention is to provide a novel cover for disposition at the outer side of a vehicle wheel and having improved means for attachment to the wheel in snap-on, pry-off relation.

Still another object of the invention is to provide an improved cover affording a generally spoke-like appearance for the outer side of a disk spider type of wheel.

Yet another object of the invention is to provide an improved cover for disposition at the outer side of a vehicle wheel and having means for air circulation through the cover and the wheel.

Other objects, features and advantages of the present invention will be readily apparent from the following detailed description of a preferred embodiment thereof taken in conjunction with the accompanying drawings in which.

Figure 1:
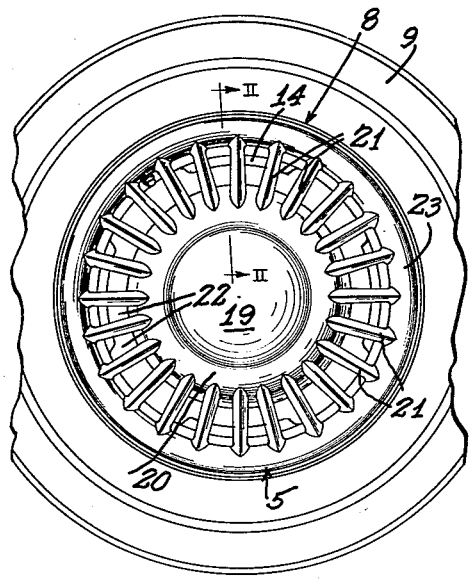
Figure 1 is a side elevational view of a wheel structure embodying features of the invention.
Figure 2:
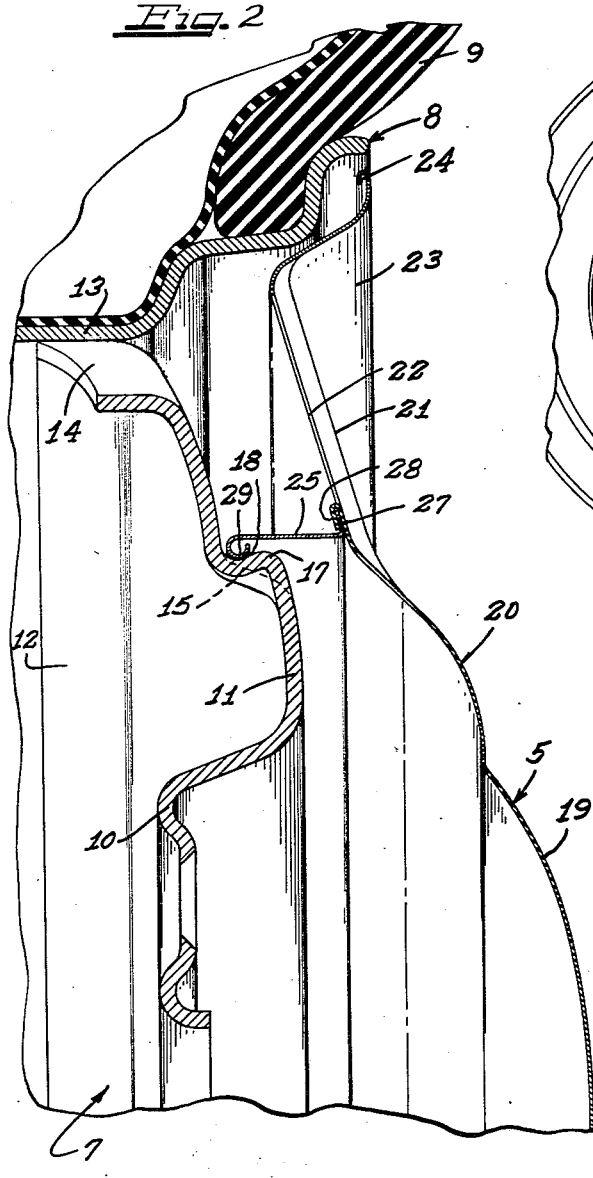
Figure 2 is an enlarged fragmentary radial sectional view taken substantially on the line II—II of Figure 1.
Figure 3:
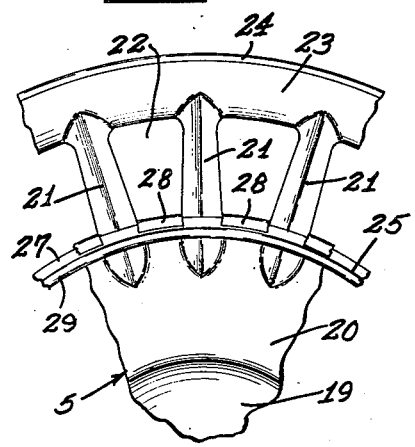
Figure 3 is a fragmentary rear elevational sectional detail view of the cover.

According to the present invention a cover 5 is provided for disposition at the outer side of a vehicle wheel which may embody features covered in my Patent No. 2,445,330, issued July 20, 1948. Such a wheel comprises a wheel body 7 of the disk spider type carrying a tire rim 8 of the drop center multi-flange type adapted to support a pneumatic tire and tube assembly 9. The wheel body 7 has a central dished bolt-on flange 10 and an annular generally axially outwardly directed reenforcing nose bulge 11 about the bolt-on flange merging at its radially outer side with a generally axially inwardly directed attachment flange 12 by which the wheel body is attached to a base flange 13 of the tire rim 8. At suitable intervals such as 4 the attachment flange 11 is inset to provide air circulation openings 14 between the wheel body and the tire rim.

For cover retaining purposes the wheel body 7 is provided at the radially outer side of the nose bulge 11 with a generally radially outwardly facing annular shoulder 15 having at suitable intervals thereon such as 3 or 4 generally radially outwardly directed cover retaining bumps 17 provided with generally radially outwardly and axially inwardly facing cover retaining shoulders 18 which are offset radially outwardly throughout their length from the shoulder 15 so as to compel radially outward deflection of a cover part that may retainingly engage the same and thereby draw radially inwardly the portions of the resilient cover part intermediate the retaining bumps.

Herein the cover 5 comprises a two part construction including a one-piece plate stamped to form from suitable sheet metal such as stainless steel or brass or the like and of a diameter to substantially completely cover the outer side of the wheel including the wheel body 7 and the tire rim 8. Centrally the cover plate has a crown portion 19 encircled by a substantially rigid annular reenforcing rib 20 from which extends a uniformly spaced series of radially outwardly and axially inwardly oblique spoke-like ribs 21 defining therebetween substantial air openings 22. The ribs 21 are preferably arched transversely with their convex sides facing axially outwardly and extend in overlying relation to the radially outer portion of the wheel body 7 and the juncture of the wheel body with the tire rim and thereby opposite the wheel openings 14 so that air may circulate freely through the openings 22 and the wheel openings 14.

At their radially outer ends the ribs 21 merge with a fairly rigid annular generally radially and axially outwardly and then radially outwardly directed marginal cover portion 23 which overlies the tire rim and has an underturned reenforcing and finishing terminal bead 24 in the assembly lying adjacent to the tip of the terminal flange of the tire rim 8. By virtue of the arched reenforced rigid structure of the spoke ribs 21 and the rigid merger thereof with respectively the rigid annular rib 20 of the cover and the rigid annular outer marginal portion 23 of the cover, the cover plate is of substantially rigid structure.

For attachment of the cover 5 to the outer side of the wheel, an attachment ring flange 25 is provided at the inner side of the cover for engagement with the retaining bump 17. To this end, the ring flange 25 comprises an axially, preferably generally cylindrical, metal annulus of substantially resilient material having at its axially outer margin a generally radially outwardly directed attachment flange 27 which underlies the outer margin of the inner cover portion 20 under the inner ends of the spoke ribs 21 in concealed relation behind the cover and is clamped in place by underturned retaining flange tabs 28 at the inner ends of the wheel openings 22 and derived from material struck from the cover in providing the openings 22 between the rib spokes 21. It will be observed that the ring flange 25 is of somewhat larger diameter than the outside diameter described by the retaining bumps 17. At its axially inner terminus, the ring flange 25 is provided by an under and inwardly turned resilient cover retaining bead 29 of annular form and of an inside diameter which is slightly less than the minimum diameter described by the retaining shoulders 18 of the retaining bumps 17.

When applying the cover 5 to the outer side of a wheel, the cover is generally centered with respect to the wheel and the retaining bead 29 is pressed against the outer nose portions of the retaining bumps 17 and as pressure is exerted inwardly against the cover the bead cams over the noses of the retaining bumps 17 by radially outward flexing of the annular bead 29 where it engages the bumps while intermediate the bumps the bead draws radially inwardly toward the shoulder 15. Then, as the bead passes axially inwardly beyond the tips of the noses of the retaining bumps 17, the bead snaps cammingly axially inwardly behind the bumps down the slanting retaining shoulders 18 and thereby retainingly grips the retaining shoulders. Since the retaining shoulders 18 are disposed in offset relation radially outwardly from the shoulder 15, radially outward resilient deflection of the bead 29 will persist in the retained relationship thereof with respect to the bumps 17 and the portions of the bead intermediate the bumps will remain in radially inwardly drawn or deflected resilient condition as well as in bottomed relation to the wheel body juncture of the shoulder 15 with the wheel body, in substantially the same manner as described in my aforesaid patent where engagement of a hub cap bead with the bumps is described. It will be appreciated that the flange 25 and the retaining bead 29 function substantially the same as the outer margin of a hub cap would in engagement with the retaining bumps 17.

The axial extent of the flange 25, that is its width, is such that after the retaining bead 29 has entered into full retaining engagement with the bumps 17 and has bottomed against the wheel body, the cover plate will be held in spaced centered substantially floating relation to the outer side of the wheel body and the tire rim.

For removing the cover from the wheel a pry-off tool may be inserted behind the outer marginal portion 23 and pry-off force applied to snap the bead 29 free from the retaining bumps 17.

It will be understood that modifications and variations may be effected without departing from the scope of the novel concepts of the present invention.

I claim as my invention:

1. In a wheel structure including a tire rim and a wheel body having retaining bumps thereon, a cover for disposition at the outer side of the wheel comprising a cover plate for substantially covering the outer side of the wheel, and a ring flange carried behind the cover plate and having a beaded margin engageable in resilient snap-on pry-off relation with the bumps, said flange having an axially outer margin attached to the cover plate by tabs bent under from the cover plate.

2. In a wheel structure including a tire rim and a wheel body with openings through the wheel adjacent juncture of the rim and body and cover retaining bumps on the wheel body located in radially inwardly spaced relation from the wheel openings, a cover for disposition at the outer side of the wheel comprising a plate for substantially entirely covering the wheel body and the tire rim, said plate having an intermediate rib spoke area with openings between the spokes opposite the wheel openings for circulation of air through the cover and the wheel, and a cover retaining axially directed resilient ring flange extending axially inwardly from the plate at the radially inner ends of the spokes and engageable in snap-on pry-off relation with said bumps.

3. In a wheel structure including a tire rim and a wheel body with openings through the wheel adjacent juncture of the rim and body and cover retaining bumps on the wheel body located in radially inwardly spaced relation from the wheel openings, a cover for disposition at the outer side of the wheel comprising a plate for substantially entirely covering the wheel body and the tire rim, said plate having an intermediate rib spoke area with openings between the spokes opposite the wheel openings for circulation of air through the cover and the wheel, and a cover retaining axially directed resilient ring flange extending axially inwardly from the plate at the radially inner ends of the spokes and engageable in snap-on pry-off relation with said bumps, said ring flange being attached to the cover plate by tabs turned under from material struck out from the cover plate in forming said openings.

4. In a cover for disposition at the outer side of a vehicle wheel, a cover plate having radially inner and outer portions connected by spoke ribs affording openings through the cover, and a cover attachment flange connected to the plate adjacent the radially inner ends of the spoke ribs and extending generally axially inwardly for engagement with a wheel, said flange having a portion thereof engaging the inner side of the cover plate and attached thereto by underturned tabs struck from the plate in the formation of the openings between the rib spokes and clampingly engaging the flange.

5. In a cover for disposition at the outer side of a vehicle wheel, a cover plate having circular inner and outer spaced substantially rigid portions connected by generally radially extending spoke ribs of rigid structure, and a cover retaining flange attached to the radially inner portion of the cover and extending inwardly therefrom for attachment to a wheel, said flange having an axially outer marginal portion directed generally radially outwardly and underlying the inner cover portion and said inner cover portion having tabs bent under and into clamping relation to said marginal flange portion.

6. In a cover for disposition at the outer side of a vehicle wheel, a cover plate having circular inner and outer spaced substantially rigid portions connected by generally radially extending spoke ribs of rigid structure, and a cover retaining flange attached to the radially inner portion of the cover and extending inwardly therefrom for attachment to a wheel, said flange having an axially outer marginal portion directed generally radially outwardly and underlying the inner cover portion and said inner cover portion having tabs bent under and into clamping relation to said marginal flange portion, said flange having a turned inner marginal bead for engagement with retaining bumps on a wheel.

7. In a wheel structure including a tire rim and a wheel body providing openings for air circulation through the wheel adjacent the tire rim, a cover for disposition at the outer side of the wheel including a cover plate for substantially covering the outer side of the wheel body and the tire rim, the portion of the cover overlying the wheel openings having a substantial series of openings therethrough for circulation of air through the cover and said wheel openings, and means carried behind the cover plate and engageable with the wheel for attachment of the cover to the wheel, said cover plate having tabs bent under from material derived from said openings, said tabs securing said cover attaching means to the cover plate.

8. In a cover for disposition at the outer side of a vehicle wheel, a cover member having radially inner and outer portions spaced apart and connected by a series of generally radially extending ribs that merge into said portions of the cover and on one of said cover portions extend a substantial distance thereinto, and a cover attaching ring member having means thereon engageable with a wheel for retaining the cover on the wheel, said ring member having a margin thereof attached to said one cover portion with said ribs extending thereacross in reinforcing relation.

9. In a cover for disposition at the outer side of a vehicle wheel, a cover plate having radially inner and outer spaced portions with narrow rigid spoke ribs connecting such portions, said spoke ribs being spaced apart greater distance than the width of the spokes to provide openings between the spokes of which the total area is greater than the total area of the spokes between the openings, said spoke ribs having rigid merging ends connecting the same to said cover portions, and a ring member extending axially inwardly from one of said portions adjacent the ends of the spoke ribs at such portion and reinforcing such portion, said ring member having means at the axially inner margin thereof for retaining engagement with a wheel.

References Cited in the file of this patent

UNITED STATES PATENTS

| Re. 19,467 | Lyon | Feb. 12, 1935 |
| Re. 21,059 | Hunt | Apr. 25, 1939 |
| Re. 23,075 | Lyon | Jan. 11, 1949 |
| D. 167,271 | McLeod | July 15, 1952 |
| 2,386,243 | Lyon | Oct. 9, 1945 |
| 2,576,683 | Horn | Nov. 27, 1951 |
| 2,646,862 | Dodge | July 28, 1953 |
| 2,676,850 | McLeod | Apr. 27, 1954 |